H. A. VAN VALKENBURG.
FOOT PEDAL FOR AUTOMOBILES.
APPLICATION FILED DEC. 1, 1917.
1,309,557.
Patented July 8, 1919.
2 SHEETS—SHEET 2.
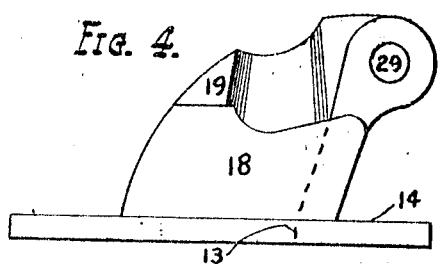
Fig. 4.
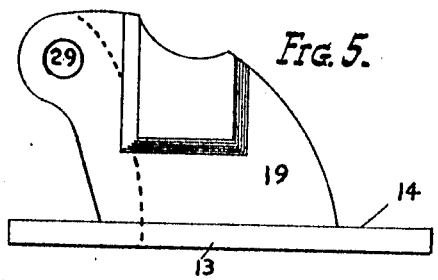
Fig. 5.
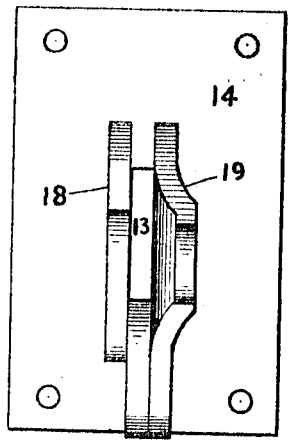
Fig. 6.
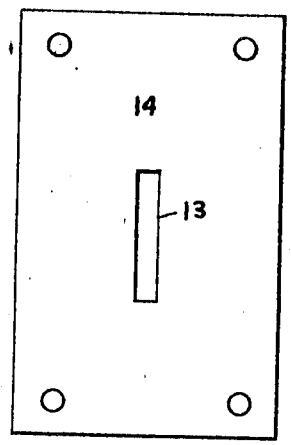
Fig. 7.
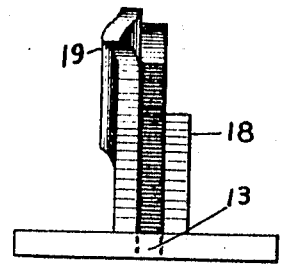
Fig. 8.
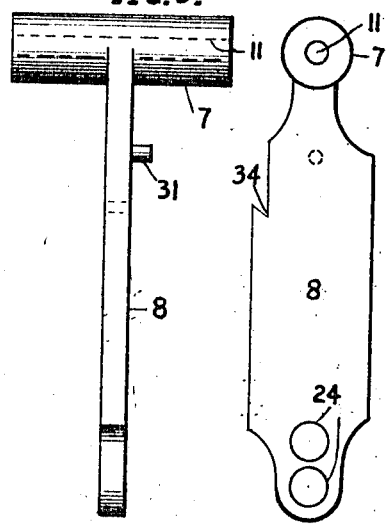
Fig. 9.    Fig. 10.    Fig. 11.
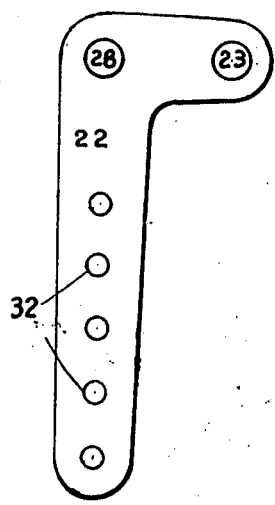
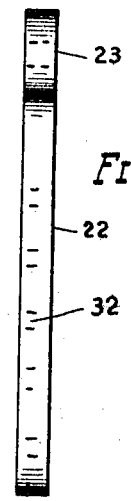
Fig. 12.
Inventor
Harold A. Van Valkenburg
By Harry C. Schroeder
Attorney

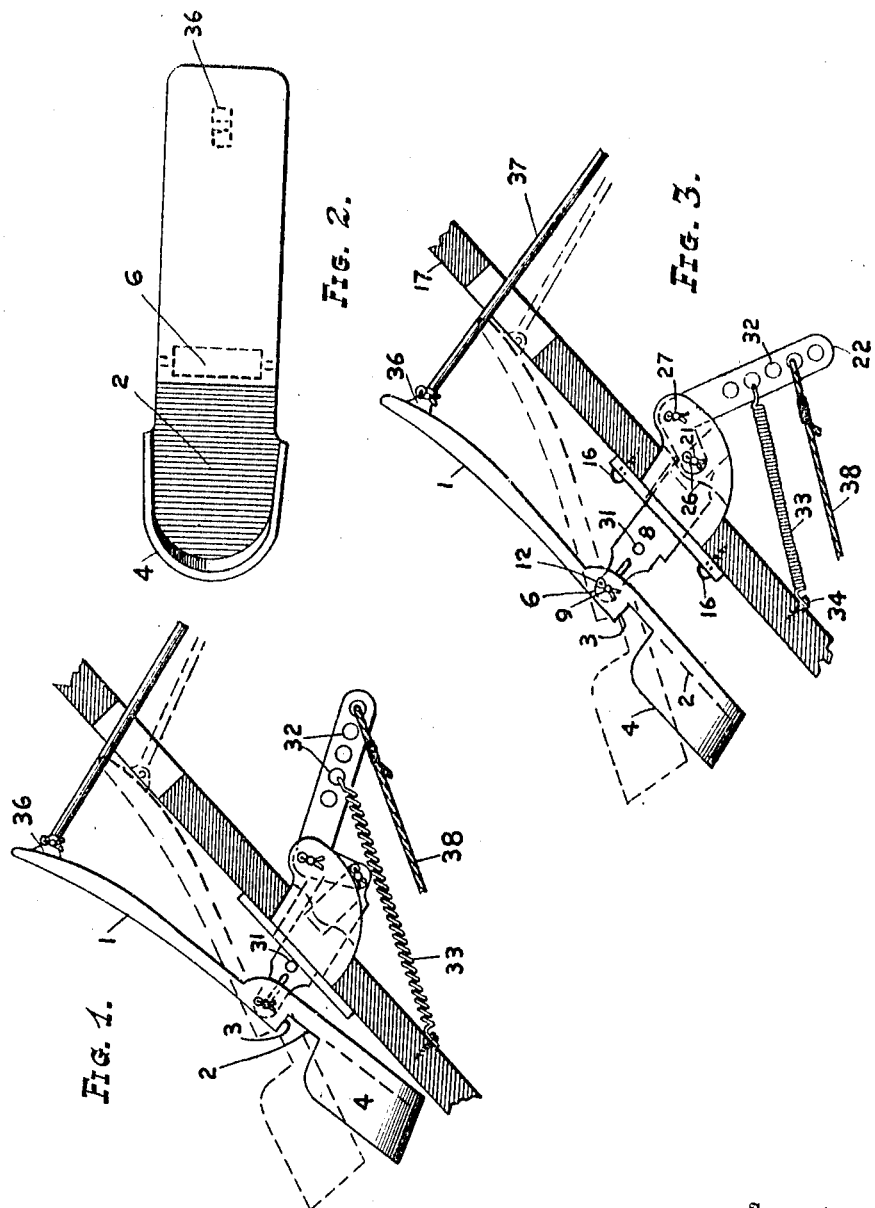

UNITED STATES PATENT OFFICE.

HAROLD A. VAN VALKENBURG, OF OAKLAND, CALIFORNIA.

FOOT-PEDAL FOR AUTOMOBILES.

1,309,557.   Specification of Letters Patent.   Patented July 8, 1919.

Application filed December 1, 1917. Serial No. 204,958.

*To all whom it may concern:*

Be it known that I, HAROLD A. VAN VALKENBURG, citizen of the United States, residing at Oakland, in the county of Alameda and State of California, have invented certain new and useful Improvements in Foot-Pedals for Automobiles, of which the following is a specification.

The present invention is an improvement in pedal controlled mechanisms.

The principal object of the invention is to provide a dual control mechanism whereby one pedal may be made to do the work of two, as for instance in the case of an automobile to make a pedal mechanism of such construction that it will perform two distinct operations at the will of the driver such as the operation of the gasolene throttle and the muffler cut out. By this means it will be unnecessary to move the foot from one device to another as is now necessarily customary where two pedals are used.

Obviously this will result in a saving of space in all foot controlled mechanism and increase the efficiency of operators by the consequent saving of time.

These objects are fully accomplished by the novel structure described in the following specification and illustrated in the accompanying drawings, in which, Figure 1 is a fragmentary sectional view of an automobile dash with my improved pedal in place thereon.

Fig. 2 is a top plan view of a pedal.

Fig. 3 is a view similar to Fig. 1 but showing the component parts of my invention in a different position.

Fig. 4 is a side view of a floor plate casting.

Fig. 5 is an opposite side view of same.

Fig. 6 is a bottom plan view of same.

Fig. 7 is a top plan view of same.

Fig. 8 is an end view of same.

Fig. 9 is a front elevation of a lever.

Fig. 10 is a side elevation of same.

Fig. 11 is a side view of an elbow lever.

Fig. 12 is an end view of same.

Referring to the drawings, Fig. 1 indicates a pedal casting adapted in size and shape to receive the sole of a shoe. The pedal 1 is provided with a depressed heel portion 2 so arranged that the heel of a shoe on the operator will be arrested from forward movement by a vertical wall 3. A guard 4 surrounding the rear of the heel and for a distance forward on each side prevents the heel from sliding off the pedal rearwardly or in a sidewise direction.

In the under surface of the pedal 1 is a square mortise 6 to receive the head 7 of a lever 8 pivotally attached to said pedal 1 by a pin 9 extending through holes in the side walls of the pedal 1 and through a hole 11 in the lever 8, and secured by a cotter pin 12.

The lever 8 extends downwardly through a rectangular slot 13, in a floor plate casting 14 secured by screws 16 to the dash 17.

The bottom surface of the casting 14 is provided with downwardly projecting walls 18 and 19 integral therewith and forming guides for the lever 8.

The lever 8 is pivotally connected at its lower end by a pin 21 to one end of an elbow lever 22. The pivot pin 21 extends through a hole 23 in elbow lever 22 and through either of two similar holes 24 in the lever 8 and is secured by a cotter pin 26.

The elbow lever 22 is pivoted at its elbow on a pin 27 extending through a hole 28 in said lever and also through a hole 29 in wall 19 of floor plate casting 14.

It will be seen from this construction that the lever 22 will be vibrated as shown in dotted lines in Fig. 3, when the lever 8 is depressed by the pedal 1.

In order to limit the amount of said depression a lug 31 is cast integral with lever 8 for preventing its further entrance into slot 13.

The lever 22 is provided with a series of holes 32 in any suitable one of which is one end of a coiled tension spring 33, the opposite end of which is secured by a screw 34 to the dash 17.

It will be seen that the leverage furnished by spring 33 will yieldably support the lever 8 in the position shown in Fig. 3, where the pedal 1 may be vibrated as shown in dotted lines, and when the operator desires he may depress the pedal 1 bodily and thereby vibrate the lever 22.

The lever 8 is provided with a notch 34 for engaging, when said lever is depressed, the under surface of the floor plate 14 (as shown in Fig. 1) and hold said lever in said depressed position because of the tension of spring 33 until such time as the operator pushes the pedal 1 forward far enough to release notch 34 from engagement when it will return to position shown in Fig. 3.

It is possible to vibrate the pedal 1 independently in either of the positions shown in Figs. 1 or 3.

The pedal 1 has a lug 36 or under surface having a hole for pivot connection with a rod 37 controlling a throttle or similar device.

A cable 38 is connected to any suitable one of the series of holes 32 and leads to muffler cut out or any desired part of the car. It will be seen that either the rod 37 or the cables 38 may be operated independently.

What I claim as new and wish to secure by Letters Patent is:—

A dual control pedal mechanism comprising a pedal pivoted near its center on a bar slidable in a slot in a floor plate, said bar provided with a lug to limit its movement in said slot, and provided also with a notch for engaging the nether surface of said floor plate, the said bar adapted, when depressed, to vibrate an elbow lever pivoted at the elbow to a portion of said floor plate and one member of said elbow lever provided with a plurality of holes for engaging one end of a coiled tension spring, the opposite end of which is suitably connected to the floor carrying the floor plate, the said spring adapted normally to keep the said notched bar in engagement with the floor plate, a lug on one end of said pedal for securing one end of a connecting rod and holes in one member of said elbow lever for connection with one end of a connecting rod or cable.

In testimony whereof I affix my signature.

HAROLD A. VAN VALKENBURG.